April 7, 1925.
A. MAJOR
1,532,913
CAN HOLDER
Filed Aug. 20, 1924
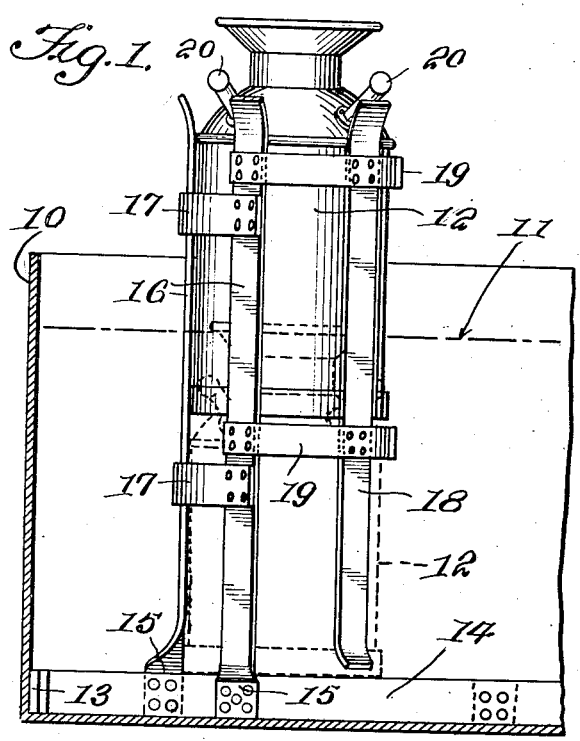
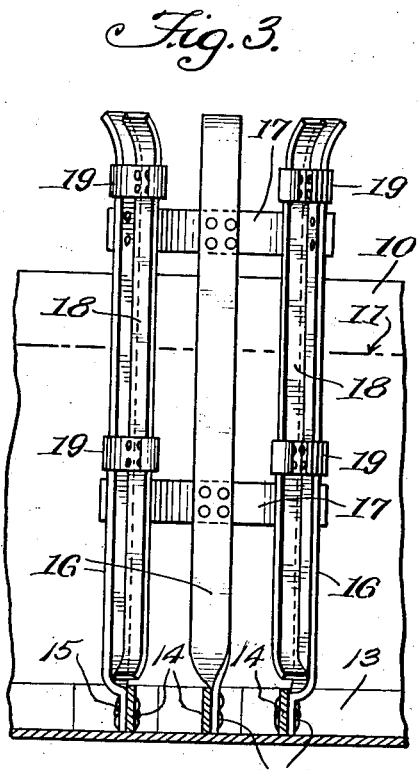
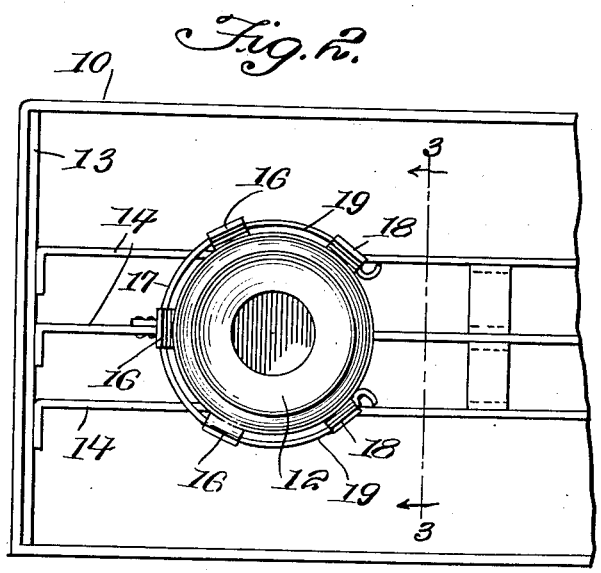
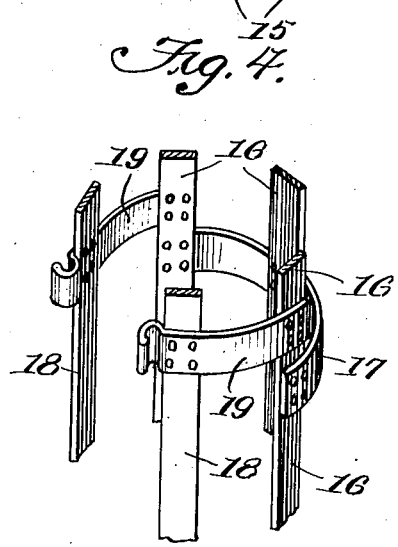
Alfred Major
INVENTOR
BY Victor J. Evans
ATTORNEY
WITNESS: J. L. Wright Patented Apr. 7, 1925.

1,532,913

UNITED STATES PATENT OFFICE.

ALFRED MAJOR, OF HOLLAND, NEW YORK.

CAN HOLDER.

Application filed August 20, 1924. Serial No. 733,209.

*To all whom it may concern:*

Be it known that I, ALFRED MAJOR, a citizen of the United States, residing at Holland, in the county of Erie and State of New York, have invented new and useful Improvements in Can Holders, of which the following is a specification.

It is the purpose of this invention to provide a can holder primarily intended for use in conjunction with milk cans, and designed to hold empty milk cans upright in the water of a cooling tank, and allow the can to lower itself as it is filled with milk, the holder being of novel construction to also permit the milk can to be easily and quickly associated with or removed from the holder as the occasion may require.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view showing how the holder is used to maintain an empty milk can in an upright position within the cooling tank, the latter being shown in section.

Figure 2 is a top plan view of Figure 1.

Figure 3 is a sectional view taken on line 3—3 of Figure 2, with the can omitted.

Figure 4 is a fragmentary perspective view of the holder.

Referring to the drawing in detail 10 indicates a cooling tank of well known construction adapted to contain a quantity of water or the like in which milk cans are arranged for the purpose of cooling the milk, the water level being indicated at 11, and the can indicated at 12.

It is the purpose of this invention to provide means for holding these cans in an upright position as they rise to the top of the tank, and allow the can to be lowered by the weight of the milk when the latter is poured into the can. As shown in Figures 1 to 3 inclusive, I arrange across the bottom of the tank 10 adjacent each end thereof a transverse strip 13, while arranged longitudinally of said bottom and secured to said strip 13 in any suitable manner is a plurality of spaced parallel members 14 arranged edgewise on said bottom. The holder is of cylindrical contour in cross section and open at one side, and possessing the desired degree of resiliency to allow the can 10 to be positioned within the holder or removed therefrom as the occasion may require, and this may be accomplished by inserting and removing the can from the top of the holder or from one side thereof as will be hereinafter explained.

The holder is made up of an annular series of vertically disposed flat bars, three of which have their lower ends riveted or otherwise permanently secured to the longitudinally disposed strips 14 above referred to as at 15. These bars are twisted adjacent their lower ends so as to lie flat against the can 12 as will be readily understood. The three bars just mentioned are indicated at 16, and are all connected together and suitably braced by arcuate shaped metal pieces 17, this construction constituting what I term the rear part of the holder. In addition to the three bars 16 use is also made of a pair of similar bars indicated at 18, the lower ends of which are separated from the longitudinal strips 14 arranged upon the bottom of the tank, inasmuch as these bars 18 constituting the front of the holder are yieldably supported, and are therefore adapted to be moved away from each other when the can 12 is inserted within or removed from the holder at the front thereof. The bars 18 are supported by the adjacent end bars 16 through the instrumentality of curved springs 19 and it is by reason of this construction that the movable bars 18 are capable of being separated in a manner for the purpose just mentioned. When the bars 18 are in their normal positions, the holder surrounds the can 12 to prevent the latter from tilting in any direction, and therefore maintains an empty can in an upright position when a can floats to the top of the tank as shown in Figure 1. The can however is not tightly embraced by the holder, so that when the can is filled with milk, the can is allowed to gravitate within the tank, and guided in its movements by means of the holder described. It will be also noted that the corresponding upper ends of all of the bars forming the holder are flared outwardly to facilitate the insertion of the can within the holder from the top thereof, and to also permit a proper hold to be obtained on the handles 20 to remove the can from the top of the holder.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. The combination with a cooling tank for milk cans of a can holder supported on the bottom of said tank and designed to maintain an empty can in an upright position as it rises to the top of the tank, and also allow said can to gravitate as it is filled.

2. The combination with a cooling tank for milk cans of a can holder rising from the bottom of said tank and designed to maintain an empty can in an upright position as it rises to the top of the tank, and also allow the can to gravitate as it is filled, said holder comprising a plurality of stationary members, and a plurality of relatively movable members, all of said members being arranged in annular series and having their upper ends flared outwardly.

3. A milk can holder for a cooling tank comprising an annular series of spaced bars, means for securing certain of the bars to the bottom of the tank whereby said bars are held stationary, the remaining bars of said series being spaced from the bottom of the tank, and yieldable means supporting the last mentioned bars on the adjacent stationary bars for the purpose specified.

In testimony whereof I affix my signature.

ALFRED MAJOR.